Nov. 5, 1946.　　　C. B. GWYN, JR　　　2,410,730
SELF-LOCKING NUT
Filed Aug. 4, 1943
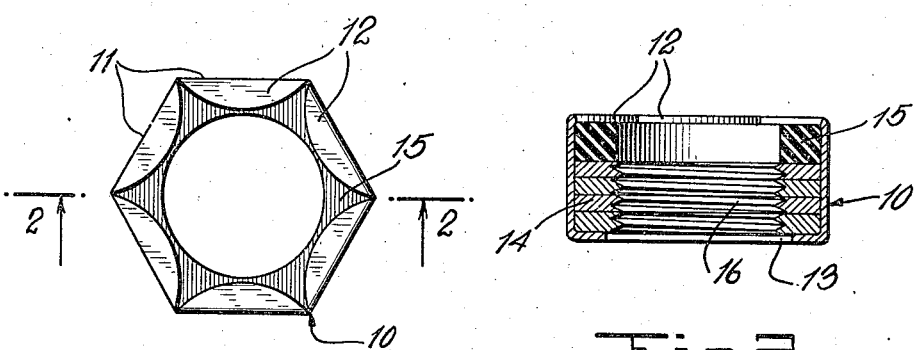
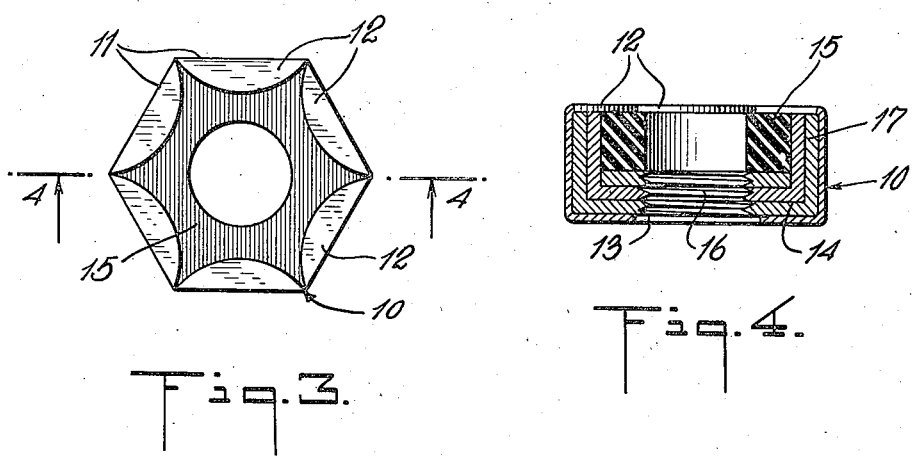
INVENTOR
Childress B Gwyn Jr
BY
Kenyon & Kenyon
ATTORNEYS Patented Nov. 5, 1946

2,410,730

UNITED STATES PATENT OFFICE 2,410,730

SELF-LOCKING NUT

Childress B. Gwyn, Jr., Bannockburn, Ill., assignor, by mesne assignments, to Allied Control Company, Inc., New York, N. Y., a corporation of New York Application August 4, 1943, Serial No. 497,280

1 Claim. (Cl. 151—7)

This invention relates to self-locking nuts.

A known type of self-locking nut comprises a cup-shape shell containing a metal nut member and a preferably fibrous locking member held in place in the shell by inturned tabs on or extensions of the wall portions of the shell. The size of bore which can satisfactorily be punched in the metal nut member is limited by the thickness and width of the nut member. Therefore, it has not heretofore been possible to produce commercially this type of nut with as large a bore for a given width and thickness specified by the trade for certain uses.

An object of this invention is a self-locking nut contatining a nut member in which the bore is formed by a stamping operation irrespective of the relation of the thickness and area of the finished nut to the size of the bore.

In accordance with this invention, the nut member is made up of a series of metal laminae in which the relation of the area and thickness of the laminae to the size of the bore is such that the bore can be satisfactorily punched therein. The laminae are suitably bonded together to form the nut member and the bore is tapped in the usual manner. The nut member, together with a locking member, are assembled within a shell as heretofore known to form a self-locking nut.

Other objects, novel features and advantages of this invention will become apparent from the following specification and accompanying drawing, wherein:

Fig. 1 is a plan view of a nut embodying one form of the invention;

Fig. 2 is a section on the line 2—2 of Fig. 1;

Fig. 3 is a plan view of a nut embodying a modified form of the invention and

Fig. 4 is a section on the line 4—4 of Fig. 3.

A nut embodying this invention comprises a sheet metal cup or casing 10 formed from a suitable blank in such manner as to have a series of flat wall portions 11 defining a polygonal socket with each wall portion being provided with a tapered extension or tab 12 adapted to be bent inwardly for the purpose later to become apparent. The bottom of the cup or casing is provided with a central aperture 13.

Within the casing and resting on the bottom thereof is a metallic nut member 14 and a locking member 15 composed of vulcanized fiber, Bakelite, rubber or other elastic and relatively tough material of like nature engages the nut member 14. The nut member 14 and locking member 15 are retained in the casing by the inturned tabs 12 which engage the exposed surface of the locking member 15.

In the modification of Figs. 1 and 2, the nut member 14 is composed of a plurality of superposed flat annuli, each of which has the same exterior shape as the interior shape of the casing and is provided with a central bore. The annuli are bonded to each other by brazing or its equivalent and may also be bonded to the casing 10 as well. The central bore 16 of the nut member is threaded, the threading operation preferably being preformed after the annuli have been bonded together. Each annulus is sufficiently thin that the relationship between the size of the bore and the area of the annulus permits punching out the aperture.

The modification disclosed in Figs. 3 and 4 differs from the modification disclosed in Figs. 1 and 2 in that some of the annuli, instead of being flat, are provided with upturned flanges 17 which vary in height and spacing from the axis so as to permit assembling a plurality thereof into a unitary nut member. The annuli are bonded to each other and in some instances the outer annulus is bonded to the casing, so that the flanges 17 reinforce the wall of the casing. In this modification, the annuli also are composed of sufficiently thin metal to permit stamping out the required size of bore.

I claim:

In a self-locking nut, a cup-like metal casing of polygonal contour, a nut member in said casing and composed of a plurality of apertured metal laminae shaped to co-operate with the inner wall of said casing to prevent rotary movement of said nut member relative to said casing and having contacting flat plane surface portions, certain of said laminae having flanges reinforcing the casing wall, and apertured locking member in said casing in engagement with said nut member, means for retaining said nut and locking member in said casing, and threads formed on the laminae surface defining the nut bore.

CHILDRESS B. GWYN, JR.